United States Patent
Hidaka

(10) Patent No.: US 9,276,465 B2
(45) Date of Patent: Mar. 1, 2016

(54) SWITCHING REGULATOR DETECTING ABNORMALITY IN POWER SUPPLY VOLTAGE

(75) Inventor: Yuji Hidaka, Tokyo (JP)

(73) Assignee: PS4 Luxco S.a.r.l., Luxembourg (LU)

(*) Notice: Subject to any disclaimer, the term of this patent is extended or adjusted under 35 U.S.C. 154(b) by 1100 days.

(21) Appl. No.: 13/137,970

(22) Filed: Sep. 22, 2011

(65) Prior Publication Data

US 2012/0081093 A1 Apr. 5, 2012

(30) Foreign Application Priority Data

Oct. 1, 2010 (JP) ................. 2010-223506

(51) Int. Cl.
*G05F 1/56* (2006.01)
*H02M 3/156* (2006.01)

(52) U.S. Cl.
CPC ..................... *H02M 3/156* (2013.01)

(58) Field of Classification Search
CPC ............ G05F 3/16; G05F 3/205; G05F 3/24
USPC ................................ 323/282–285
See application file for complete search history.

(56) References Cited

U.S. PATENT DOCUMENTS

| | | | |
|---|---|---|---|
| 6,101,106 A * | 8/2000 | Shi .................... | 363/41 |
| 6,621,257 B2 | 9/2003 | Mitamura et al. | |
| 6,930,520 B2 * | 8/2005 | Solie ................. | 327/131 |
| 7,151,363 B1 * | 12/2006 | Scott et al. ........ | 323/282 |
| 7,615,978 B2 * | 11/2009 | Guo .................. | 323/282 |
| 8,159,204 B2 * | 4/2012 | Grant ................ | 323/285 |
| 8,294,447 B2 * | 10/2012 | Xie ................... | 323/299 |
| 8,305,055 B2 * | 11/2012 | Wu et al. .......... | 323/259 |
| 8,310,221 B2 * | 11/2012 | Herzer et al. ..... | 323/283 |
| 8,415,933 B2 | 4/2013 | Loikkanen et al. | 323/225 |
| 8,441,813 B2 * | 5/2013 | Tan et al. .......... | 363/21.03 |
| 8,519,691 B2 * | 8/2013 | McCloy-Stevens | 323/284 |
| 8,541,993 B2 * | 9/2013 | Notman et al. ... | 323/271 |
| 2009/0097284 A1 | 4/2009 | Takei et al. | |

FOREIGN PATENT DOCUMENTS

| | | | |
|---|---|---|---|
| JP | 2002-369503 A | 12/2002 | |
| JP | 2009-100498 A | 5/2009 | |
| JP | 2009-118651 A | 5/2009 | |

* cited by examiner

*Primary Examiner* — Adolf Berhane
*Assistant Examiner* — Nusrat Quddus
(74) *Attorney, Agent, or Firm* — Kunzler Law Group, PC

(57) ABSTRACT

A switching regulator includes: a switching element that controlling supply of power supply voltage according to a control signal; a smoothing circuit smoothing the power supply voltage supplied via the switching element and supplying the smoothed power supply voltage as an output voltage to an output terminal; an error amplifier outputting an error signal according to a difference between the output voltage supplied to the output terminal and a reference voltage; a delta sigma modulation circuit generating a delta sigma modulation signal according to the error signal; and a power supply abnormality detection circuit outputting the delta sigma modulation signal as the control signal and detecting an abnormality in the power supply voltage based on the delta sigma modulation signal.

12 Claims, 4 Drawing Sheets

SWITCHING REGULATOR DETECTING ABNORMALITY IN POWER SUPPLY VOLTAGE

This application is based upon and claims the benefit of priority from Japanese patent application No. 2010-223506, filed on Oct. 1, 2010, the disclosure of which is incorporated herein in its entirety by reference.

BACKGROUND OF THE INVENTION

This invention relates to a switching regulator, and in particular to a switching regulator employing a delta-sigma modulation scheme as a switching scheme.

Recently, switching regulators are widely employed as power-supply devices in various types of electronic equipment for the reason that the switching regulators are advantageous in terms that they are small in size and have high efficiency, and can be highly integrated. These switching regulators usually employ a PWM modulation scheme as their switching scheme, whereas the use of a delta-sigma modulation scheme has been increased as well.

A power-supply device is required to detect an instantaneous drop in power supply voltage (instantaneous break) in order to protect a load supplied with power by the power-supply device and to protect the power-supply device itself.

Japanese Laid-Open Patent Publication No. 2009-118651 (Patent Document 1) describes a technology in which a voltage at an internal circuit power supply terminal (VDD) is monitored, and switching operation of a switching element is stopped once it is detected that the monitored voltage has dropped below a predetermined voltage.

Japanese Laid-Open Patent Publication No. 2009-100498 (Patent Document 2) describes a technology in which any instantaneous break in power supply voltage is detected by detecting that the ON time of a switching element has exceeded a predetermined value.

SUMMARY

The technology described in Patent Document 1 has a drawback that a complicated control circuit (start/stop circuit) is required for detecting a terminal voltage and controlling the switch according to the detected voltage.

The technology described in Patent Document 2 is a method suitable for a PWM modulation scheme but not applicable to a delta-sigma modulation scheme.

This invention seeks to solve one or more of the above problems, or to improve upon those problems at least in part.

In one embodiment, there is provided a switching regulator that is characterized by having: a switching element controlling supply of power supply voltage according to a control signal; a smoothing circuit smoothing the power supply voltage supplied via the switching element and supplying the smoothed power supply voltage as an output voltage to an output terminal; an error amplifier outputting an error signal according to a difference between the output voltage supplied to the output terminal and a reference voltage; a delta sigma modulation circuit generating a delta sigma modulation signal according to the error signal; and a power supply abnormality detection circuit outputting the delta sigma modulation signal as the control signal and detecting an abnormality in the power supply voltage based on the delta sigma modulation signal.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
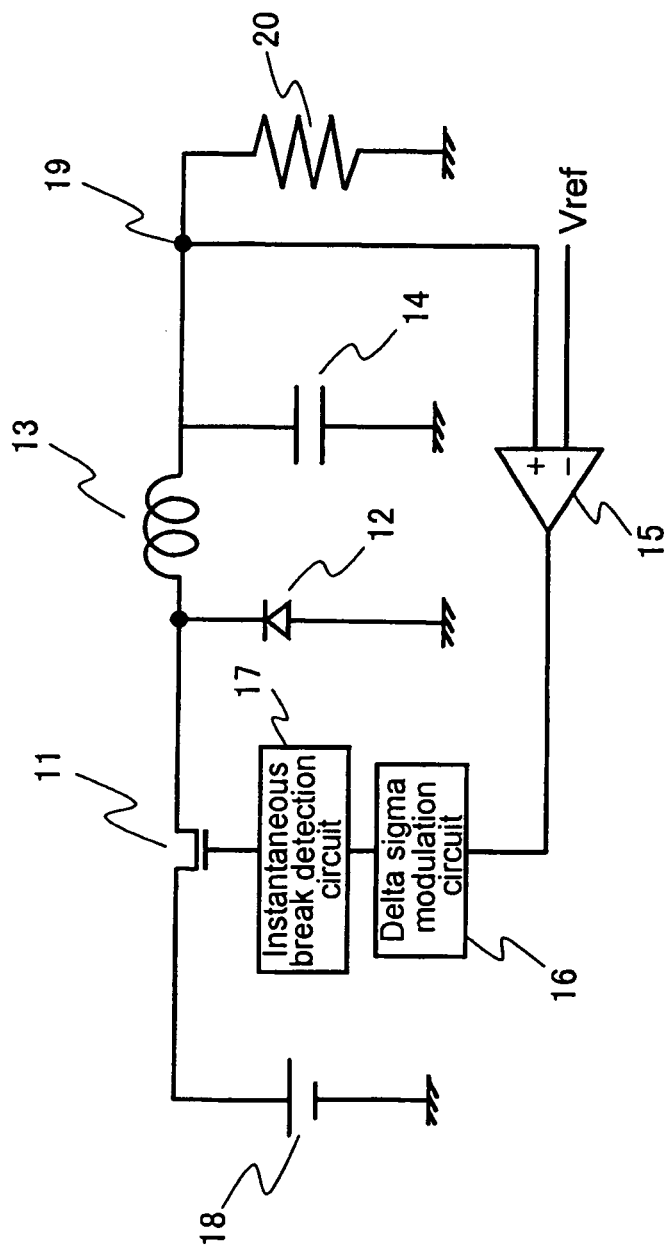
FIG. 1 is a circuit diagram illustrating a schematic configuration of a switching regulator according to a first embodiment of this invention.

FIG. 1 shows a schematic configuration of a switching regulator according to a first embodiment of this invention. This switching regulator is usable for example in a power supply system for electronic equipment having a high-speed DRAM.

The shown switching regulator has a switching element 11, a diode 12, a coil 13, a capacitor 14, an error amplifier 15, a delta sigma modulation circuit 16, and an instantaneous voltage drop detection circuit 17.

The switching element 11 can be formed for example by an N-channel MOS transistor. A power supply 18 is connected to the input side of the switching element 11, and a power supply voltage is supplied thereto. The switching element 11 is controlled by an output of the a instantaneous voltage drop detection circuit 17 that serves as a control signal. The switching element 11 is turned ON or OFF according to the control signal whereby a power supply voltage is supplied to the output side of the switching element 11 or the supply is stopped.

The output side of the switching element 11 is connected to the cathode of the diode 12 and one end of the coil 13. The anode of the diode 12 is grounded, and the other end of the coil 13 is connected to an output terminal 19 and to an end of the capacitor 14. The other end of the capacitor 14 is grounded. A load circuit 20 is connected to the output terminal 19. The diode 26, the coil 27 and the capacitor 28 together function as a (rectification) smoothing circuit, which smoothes (stabilizes) the power supply voltage intermittently supplied thereto through the switching element 11 and supplies the smoothed voltage to the output terminal 19.

The output terminal 19 is connected to one input of the error amplifier 15, and a reference voltage Vref is supplied to the other input. The error amplifier 15 outputs a signal (error signal) according to a difference between the output voltage supplied to the output terminal 19 and the reference voltage Vref.

The input of the delta sigma modulation circuit 16 is connected to the output of the error amplifier 15. The delta sigma modulation circuit 16 outputs a delta sigma modulation signal according to the error signal from the error amplifier 15.

The input of the instantaneous voltage drop detection circuit 17 is connected to the output of the delta sigma modulation circuit 16, and the output of the instantaneous voltage drop detection circuit 17 is connected to a control terminal of the switching element 11. The instantaneous voltage drop detection circuit 17 outputs the delta sigma modulation signal received from the delta sigma modulation circuit 16, as a control signal for the switching element 11. Since the instantaneous voltage drop detection circuit 17 detects an abnormality in power supply voltage (instantaneous disconnection (instantaneous break)) based on the received delta sigma modulation signal, the instantaneous voltage drop detection circuit 17 delays the delta sigma modulation signal by a predetermined number of clocks before outputting the same to the switching element 11. When the instantaneous voltage drop detection circuit 17 detects an abnormality in power supply voltage based on the received delta sigma modulation signal, the instantaneous voltage drop detection circuit 17 does not directly output the received delta sigma modulation signal, but generates another signal and output the generated signal as a control signal.

The shown switching regulator is a so-called step-down type switching regulator which is designed to reduce the power supply voltage to a predetermined lower voltage before supplying the same to the load circuit 20.

The switching regulator configured as described above increases the proportion of time for which the switching element 11 is kept ON when the output voltage drops below the reference voltage Vref, so that the output voltage is increased. When the output voltage exceeds the reference voltage Vref, in contrast, the switching regulator reduces the proportion of time for which the switching element 11 is kept ON so that the output voltage is reduced. In this manner, stabilization of the output voltage is realized.

The delta sigma modulation circuit 16 and the instantaneous voltage drop detection circuit 17 will be described in more detail.

Figure 2:
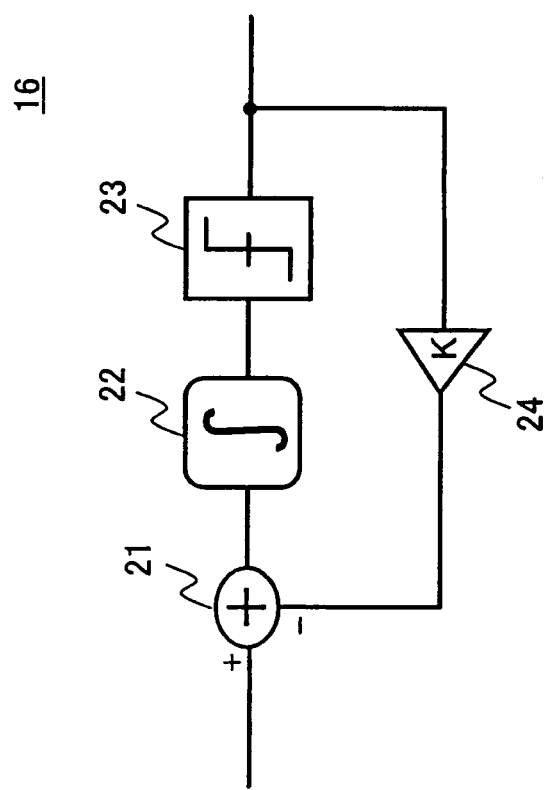
FIG. 2 is a circuit diagram illustrating a configuration example of a delta sigma modulation circuit used in the switching regulator of FIG. 1.

The delta sigma modulation circuit 16 is composed, for example, of an adder 21, an integrator 22, a quantizer 23, and a feedback amplifier 24 as shown in FIG. 2. While this is an example of a primary delta sigma modulation circuit, the delta sigma modulation circuit 16 may be a secondary or higher-order delta sigma modulation circuit.

Figure 3:
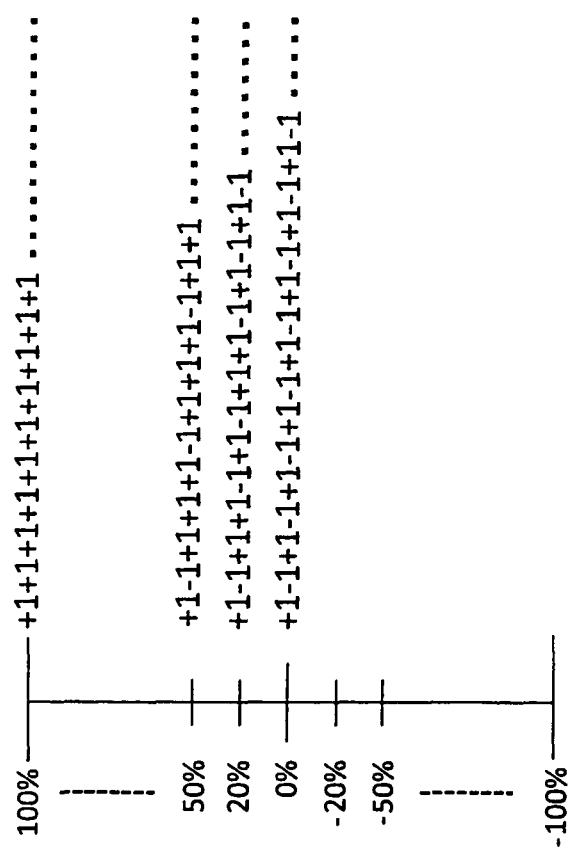
FIG. 3 is a diagram for explaining operation of the delta sigma modulation circuit of FIG. 2.

The delta sigma modulation circuit 16 outputs a signal sequence (bit stream) consisting of "+1" and "−1" according to an amplitude of the input signal. More specifically, as shown in FIG. 3, the signal sequence consisting of "+1" and "−1" is output such that a local average value of the output signal sequence matches the input amplitude (percentage). For example, when the input amplitude is 100%, the delta sigma modulation circuit 16 outputs a signal sequence consisting of consecutive "+1"s. When the input amplitude is 50%, the delta sigma modulation circuit 16 outputs a signal sequence in a ratio of one "−1" to three "+1"s. The input amplitude (percentage) represents a ratio to the maximum amplitude defined by a feedback coefficient K of the feedback amplifier 24.

A variety of known circuit topologies can be employed for the delta sigma modulation circuit 16. The signal sequence output by the delta sigma modulation circuit 16 depends on which circuit topology is employed. Therefore, the signal sequence actually output is not always as shown in FIG. 3. However, no matter which circuit topology is employed, the delta sigma modulation circuit 16 generates an output signal sequence such that the local average value of the output signal sequence matches the input amplitude.

As seen from FIG. 3, when the input amplitude becomes 0%, the delta sigma modulation circuit 16 outputs an oscillating sequence in which "+1" and "−1" are repeated alternately. The delta sigma modulation circuit 16 will not output "−1" in succession because of its configuration. If an abnormality (instantaneous break) occurs in the power supply voltage, the error amplifier stops outputting. This means that the state is established in which the input amplitude to the delta sigma modulation circuit 16 becomes 0%. In response to this state, the delta sigma modulation circuit 16 outputs an oscillating sequence. The instantaneous voltage drop detection circuit 17 detects this signal sequence output by the delta sigma modulation circuit 16.

Figure 4:
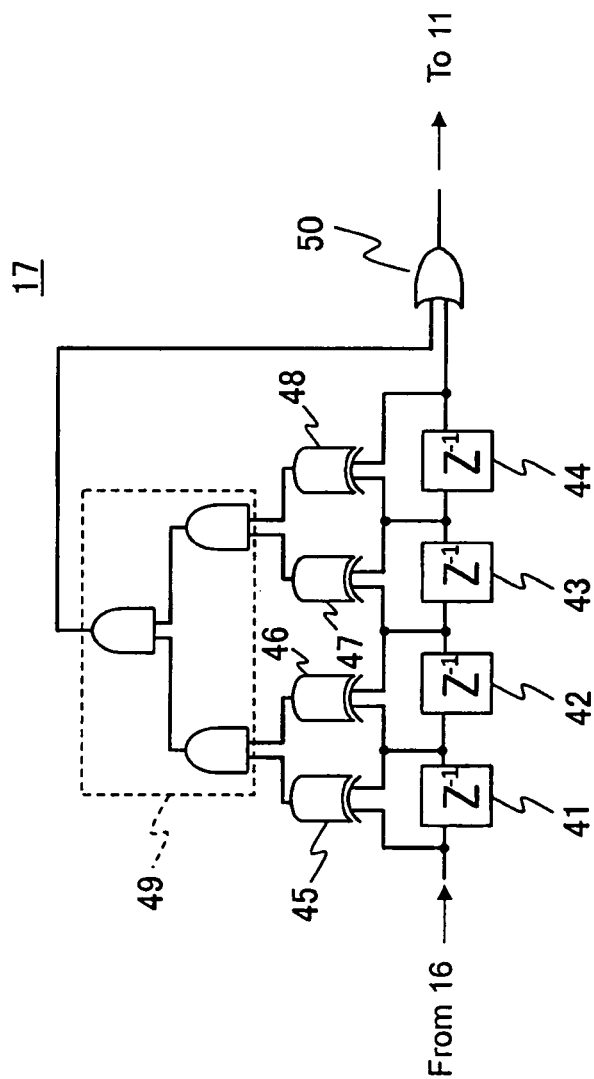
FIG. 4 is a logic circuit diagram illustrating a circuit configuration example of an instantaneous voltage drop detection circuit used in the switching regulator of FIG. 1.

The instantaneous voltage drop detection circuit 17 can be configured for example as shown in FIG. 4. Specifically, the instantaneous voltage drop detection circuit 17 has delay elements 41 to 44 connected in multiple stages in order to sequentially delay the delta sigma modulation signal from the delta sigma modulation circuit 16, exclusive OR circuits 45 to 48 for obtaining exclusive ORs of the input and output of the respective delay elements, and an AND circuit group (consisting of three AND circuits in this example) 49 for obtaining an AND of all the outputs of the exclusive OR circuits 45 to 48. This delta sigma modulation circuit 16 further has an OR circuit 50 for obtaining an OR of the output of the AND circuit group 49 and the output of the final delay element 44.

Although four delay elements are used, according to this embodiment, to satisfy the requirement of five consecutive bits for detecting that the output of the delta sigma modulation circuit 16 is an oscillating sequence, the number of delay elements may be determined depending on a circuit topology employed for the delta sigma modulation circuit 16.

The instantaneous voltage drop detection circuit 17 shown in FIG. 4 delays the delta sigma modulation signal output by the delta sigma modulation circuit 16 sequentially by the delay elements 41 to 44 and supplies the delayed signal to one input of the OR circuit 50. The "+1" and "−1" contained in the delta sigma modulation signal may be treated as logic "1" and logic "0", respectively, on a logic circuit.

The OR circuit 50 normally outputs the delta sigma modulation signal received at its one end directly to the switching element 11 as a control signal. More specifically, when the delta sigma modulation signal is not an oscillating sequence, a logic "0" is output from one or more of the exclusive OR circuits 45 to 48, and thus the output of the AND circuit group 49 becomes a logic "0". Consequently, the OR circuit 50 directly outputs the delta sigma modulation signal as it is.

When the delta sigma modulation signal becomes an oscillating sequence, all of the exclusive OR circuits 45 to 48 output a logic "1". Accordingly, the AND circuit group 49 outputs a logic "1". This means that, a detection signal indicating detection of an abnormality in power supply voltage is output. As a result, a logic "1" is input to one input of the OR circuit 50, and the OR circuit 50 consecutively outputs logic "1"s regardless of the delta sigma modulation signal. If the detected abnormality in power supply voltage is instantaneous break, the switching element 11 is kept ON by the OR circuit 50 consecutively outputting the logic "1"s, and hence the output voltage quickly recovers to a level close to a predetermined voltage. This makes it possible to prevent or suppress any adverse effect to the load circuit 20 possibly caused by the abnormality (instantaneous break) in power supply voltage.

When the delta sigma modulation signal is not an oscillating sequence any more, the output of the AND circuit group 49 returns to a logic "0", and the OR circuit 50 outputs the delta sigma modulation signal directly (delayed).

The switching regulator according to this embodiment is thus capable of detecting any abnormality in power supply voltage with a simple digital circuit configuration as shown in FIG. 4. An output of the AND circuit group 49 can be utilized as a detection signal indicating detection of an abnormality in power supply voltage. For example, it can be utilized for reporting detection of instantaneous break by lighting an indicator lamp in response to a detection signal.

Although this invention has been described in conjunction with a preferred embodiment thereof, the invention is not limited to this embodiment but may be modified in various other manners within the scope of the invention. For example, the switching element is not limited town NMOS, but any other transistor or any other type of switch can be used. Further, any type of known circuit topology can be employed for the delta sigma modulation circuit. The instantaneous voltage drop detection circuit can be configured to monitor a minimum number of bits that enables detection of an oscillating sequence in accordance with the employed circuit topology.

What is claimed is:

1. A switching regulator comprising:
a switching element to one end of which an input voltage is applied;
a smoothing circuit coupled between the switching element and a terminal, the smoothing circuit smoothing a voltage received from another end of the switching element to supply the smoothed voltage to the terminal;
an error amplifier generating an error signal indicative of a difference between a reference voltage and the smoothed voltage supplied to the terminal;
a delta sigma modulation circuit generating a delta sigma modulation signal according to the error signal generated by the error amplifier; and
a detection circuit detecting an abnormality in the input voltage based on the delta sigma modulation signal generated by the delta sigma modulation circuit.

2. The switching regulator as claimed in claim 1, wherein the detection circuit determines that there is an abnormality in the power supply when a signal sequence indicated by the delta sigma modulation signal is an oscillating sequence.

3. The switching regulator as claimed in 1, wherein the detection circuit outputs a continuous logic "1" signal in place of the delta sigma modulation signal as the control signal when detecting an abnormality in the power supply voltage.

4. The switching regulator as claimed in claim 3, wherein the detection circuit comprises:
a plurality of delay elements connected in multiple stages so as to sequentially delay the delta sigma modulation signal;
a plurality of exclusive OR circuits each for obtaining an exclusive OR of an input and an output of a corresponding one of the plurality of delay elements; and
an AND circuit obtaining an AND of all the exclusive OR circuits.

5. The switching regulator as claimed in claim 4, wherein:
the detection circuit further comprises an OR circuit obtaining an OR between an output of the AND circuit and an output of a final-stage delay element, and
an output of the OR circuit is output as the control signal.

6. The switching regulator as claimed in claim 1, wherein the detection circuit receives the delta sigma modulation signal generated by the delta sigma modulation circuit and generates a control signal by delaying the delta sigma modulation signal, the control signal being for controlling the switching element.

7. The switching regulator as claimed in claim 6, wherein the detection circuit alters an effect of the delta sigma modulation signal on the control signal when the abnormality is detected.

8. A switching regulator comprising:
a switching element to one end of which an input voltage is applied;
an error amplifier generating an error signal indicative of a difference between a reference voltage and an output voltage of the switching regulator;
an analog-to-digital converter converting the error signal generated by the error amplifier into a digital signal;
a delay circuit coupled between a control terminal of the switching element and the analog-to-digital converter, wherein the delay circuit delays the digital signal by a predetermined number of clocks; and
a detection circuit detecting an abnormality in the input voltage by cooperating with the delay circuit.

9. The switching regulator as claimed in claim 8,
wherein the delay circuit comprises a plurality of delay elements connected in series, and
wherein the detection circuit receives at least one of the output signals of the plurality of delay elements to detect the abnormality.

10. The switching regulator as claimed in claim 9, wherein the detection circuit is configured to look for a certain pattern of sequence of digital values in the digital signal.

11. The switching regulator as claimed in claim 8, further comprising a mask circuit masking the delayed digital signal when the abnormality is detected.

12. The switching regulator as claimed in claim 6, wherein the detection circuit is coupled between the delta sigma modulation circuit and a control terminal of the switching element.

* * * * *